United States Patent [19]

Hammond et al.

[11] Patent Number: 5,753,782
[45] Date of Patent: May 19, 1998

[54] POLYESTER COMPOSITION

[75] Inventors: Timothy Hammond, Stockton on Tees; John Jamieson Liggat, Glasgow; James Henry Montador, Billingham; Andrew Webb, Macclesfield, all of United Kingdom

[73] Assignee: Zeneca Limited, London, England

[21] Appl. No.: 553,649

[22] PCT Filed: Jun. 1, 1994

[86] PCT No.: PCT/GB94/01184

§ 371 Date: Apr. 25, 1996

§ 102(e) Date: Apr. 25, 1996

[87] PCT Pub. No.: WO94/28061

PCT Pub. Date: Dec. 8, 1994

[30] Foreign Application Priority Data

Jun. 2, 1993 [GB] United Kingdom ............ 9311399

[51] Int. Cl.[6] .................................................. C08G 283/04
[52] U.S. Cl. ................ 525/450; 424/444; 424/78.06; 524/270
[58] Field of Search ........................... 424/444, 445, 424/422, 423, 78.06; 524/270; 525/450

[56] References Cited

U.S. PATENT DOCUMENTS

| | | | |
|---|---|---|---|
| 3,182,036 | 5/1965 | Baptist et al. | 525/450 |
| 4,900,299 | 2/1990 | Webb | 604/11 |
| 5,169,889 | 12/1992 | Kauffman et al. | 524/270 |
| 5,231,148 | 7/1993 | Kleinke et al. | 525/450 |
| 5,296,229 | 3/1994 | Grandjean | 424/444 |

FOREIGN PATENT DOCUMENTS

| | | |
|---|---|---|
| 523 789 | 1/1993 | European Pat. Off. |
| 92/19680 | 11/1992 | WIPO . |
| 92/20738 | 11/1992 | WIPO . |
| 94/04607 | 3/1994 | WIPO . |

OTHER PUBLICATIONS

Baptist, et al: "Poly—Hydroxybutyric Acid–A Naturally Occurring Thermoplastic Material", SPE Transactions, Oct. 1964, pp. 245–250.

Ceccorulli, et al: "Plasticization of Bacterial Poly(3-hydroxybutyrate), Macromolecules" 1992, 25, 3304–3306.

Chemical Abstract: "TP–90B Plasticizer", Morton International, Apr. 1991.

Chemical Abstract: "TP–759 Plasticizer", Morton International, Mar. 1991.

*Primary Examiner*—Terressa Mosley
*Attorney, Agent, or Firm*—Pillsbury Madison & Sutro LLP

[57] ABSTRACT

Polyester composition comprising a biodegradable polyester and a plasticising quantity of at least one plasticiser selected from the group: high-boiling esters of polybasic acids; phosphoric acid derivatives; phosphorous acid derivatives; phosphonic acid derivatives; substituted fatty acids; high-boiling glycols, polyglycols, polyoxyalkylenes and glycerol each optionally substituted and optionally terminally esterified; pentaerythritols and derivatives; sulphonic acid derivatives; epoxy derivatives; chlorinated paraffins; polymeric esters; Wolflex-But*; provided that citrates does not include doubly esterified hydroxycarboxylic acids having at least 3 ester groups in its molecule and further provided that glycerols does not include glycerol triacetate and glycerol diacetate.

9 Claims, No Drawings

POLYESTER COMPOSITION

This invention relates to a polyester composition and in particular to such a composition containing biodegradable polyester and plasticiser.

Biodegradable polyesters for example the microbiologically produced polyhydroxyalkanoates can be adapted by the use of plasticiser compounds for applications where improved impact strength, improved elongation to break and improved ductility are important. Since such compounds should preferably also be biodegradable, many of the plasticisers used in synthetic polymer processing are not suitable for biodegradable polymers. Most commonly the glyceryl ester triacetin (glycerol triacetate) is used, but it is more volatile than is ideal during melt processing or storage at high ambient temperatures. Recently, a new plasticisier called Estaflex* (acetyl tri-n-butyl citrate) has been introduced for polyhydroxyalkanoates which is an improvement over triacetin, however, alternatives to these compounds are continually sought for further improvements in physical properties of the polymer, improvements in the biodegradablility and resistance to migration in the polymer, improvements in flexibility, mobility and permanence, and economic benefits. In looking for new plasticisers the applicants have unexpectedly found that a number of plasticisers or materials used in conventional plasticised systems are useful plasticisers of biodegradable polyesters.

Thus, according to the present invention there is provided a polyester composition comprising a biodegradable polyester and a plasticising quantity of at least one plasticiser selected from the group: high-boiling esters of polybasic acids; phosphoric acid derivatives; phosphorous acid derivatives; phosphonic acid derivatives; substituted fatty acids; high-boiling glycols, polyglycols, polyoxyalkylenes and glycerol each optionally substituted and optionally terminally esterified; pentaerythritols and derivatives; sulphonic acid derivatives; epoxy derivatives; chlorinated paraffins; polymeric esters; Wolflex-But*; provided that citrates does not include doubly esterified hydroxycarboxylic acids having at least 3 ester groups in its molecule and further provided that glycerols does not include glycerol triacetate and glycerol diacetate.

In the description, examples and claims herein a * indicates a tradename or registered trademark.

The majority of plasticisers used in this invention are known in the art as plasticisers of other materials. A plasticiser is a material which when added to a polymer composition makes an improvement in the ductility of the polymer. It is generally the case with most plasticised polymer systems that the extent of the plasticising effect is in direct correlation with the glass transition temperature ($T_g$) of the plasticised material, i.e. the lower the $T_g$ the greater the plasticising effect. It has now been found that in the biodegradable polyesters of the present invention, the glass transition temperature is not a predictor of the extent of beneficial effect of the plasticiser of the polymer, and surprisingly the plasticisers of the present invention are unexpectedly useful with the biodegradable polyesters of the present invention.

The biodegradable polyester may be for example, polylactic acid, polycaprolactone, polyethylene succinate, polypropylene succinate, polybutylene succinate, polyhydroxyalkanoate (PHA), for example polyhydroxybutyrate (PHB) or copolymers of hydroxybutyrate with hydroxyvalerate, i.e. polyhydroxybutyrate-co-hydroxyvalerate, (PHBV). It may be for example a poly-2-hydroxyalkanoate such as a polyglycollic acid or it may be a synthetic polypropiolactone, polybutyrolactone, polyvalerolactone, or a caprolactone copolymer.

Examples of suitable synthetic polyesters are especially polycaprolactone, polylactides, and polyesters containing combinations of dicarboxylic acids or derivatives thereof and diols. Dicarboxylic acids being selected from the group consisting of malonic, succinic, glutaric, adipic, pimelic, azelaic, sebacic, fumaric, 2,2-dimethylglutaric, suberic, 1,3-cyclopentane dicarboxylic, 1,4-dicyclohexane-dicarboxylic, 1,3-cyclohexane dicarboxylic, diglycolic, itaconic, maleic, 2,5-norbornane dicarboxylic and ester forming derivatives thereof and combinations thereof, and diols selected from the group consisting of ethylene glycol, diethylene glycol, proplyene glycol, 1,3-propanediol, 2,2-dimethyl-1,3-propanediol, 1,3 butanediol, 1,4-butanediol, 1,5-pentanediol, 1,6-hexanediol, 2,2,-trimethyl-1,6-hexanediol, thiodiethanol, 1,3-cyclohexanedimethanol, 1,4-cyclohexanedimethanol, 2,2,4,4-tetramethyl- 1,3-cyclobutanediol, triethyleneglycol, tetraethyleneglycol, di-, tri-, tetra-proplyeneglycol and combinations thereof, cellulose and cellulose esters such as acetates, propionates or butyrates, polypeptides, proteins and polyamides, copolymer of succinic acid and butylene glycol.

Examples of suitable polyesters are PHAs having units of formula I:

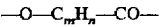

where m is in the range 1–13 and n is 2m or (if m is at least 2) 2m–2. Typically $C_m H_n$, contains 1–5 carbon atoms in the polymer chain and the remainder (if any) in a side chain. In very suitable polyesters n is 2m and especially there are units with m=3 and m=4 copolymerised together and with respectively a $C_1$ and $C_2$ side chain on the carbon next to oxygen in the chain. Particular polyesters contain a preponderance of m=3 units, for example, homopolymer of PHB, or copolymer (PHBV) especially with 70–98 mol % of such m=3 units, the balance (if any) being units in which m=4. More preferably copolymers contain 4–20 mol % of m=4 units. The molecular weight of the PHA is preferably over 50000, especially over 300000.

The PHA may also be a blend of two or more copolymers differing in their relative values of m. An example contains (a) PHA consisting essentially of Formula I units in which 2–5 mol % of units have m=4, the rest m=3; and (b) PHA consisting essentially of Formula I units in which 5–30 mol % of units have m=4, the rest m=3.

In each such PHA there are side chains as above mentioned. The proportions in such a blend are preferably such as give an average m=4 content in the range 4–18 mol %.

In each such PHA having units with m=3 and m=4 there may be very small, typically fractional, percentages of units having higher values of m. PHA consisting essentially of m=3 units is polyhydroxybutyrate (PHB), and PHA consising of m=3 and 4 units is polyhydroxybutyrate-co-valerate (PHBV).

The polyhydroxyalkanoate is preferably PHB or PHBV, which may be 3-hydroxy or 4-hydroxy or a mixture of both. Especially preferred are the (R)-3-hydroxy forms of PHB and PHBV.

The composition may contain a blend of biodegradable polyesters. In particular in such compositions, a blend of at least 50% w/w of PHA is preferred with another polymer, particularly those mentioned above. Blends of particular interest are blends of PHA with polycaprolactone, polylactic acid, and cellulose esters and up to 50% w/w of the blend preferably comprises one or more polymers selected from polycaprolactone, polylactic acid and cellulose esters, particularly PHBV and polycaprolactone and PHBV and cellulose esters.

The PHA is preferably a fermentation product, especially of a microbiological process in which a microorganism lays down PHA during normal growth or is caused to do so by cultivation in the absence of one or more nutrients necessary for cell multiplication. The microorganism may be wild or mutated or may have had the necessary genetic material introduced into it. Alternatively the necessary genetic material may be harboured by a eukariote, to effect the microbiological process.

A suitable microbiological process is described in for Formula I material with m=3 or m=partly 3, partly 4: EP-A-69497 (*Alcaligenes eutrophus*);

for Formula I materials with m=3:

U.S. Pat. No. 4,101,533 (*Alcaligenes eutrophus* H-16)

EP-A-144017 (*Alcaligenes latus*);

for Formula I material with m=7–13

EP-A-0392687 (various Pseudomonas)

The PHA can be extracted from the fermentation product cells by means of an organic solvent, or the cellular protein material may be decomposed leaving microscopic granules of polymer. For specialised end uses the cellular protein may be partly or wholly allowed to remain with the PHA, but preferably subjected to cell breakage.

Alternately, the PHA can be a product of synthetic chemistry. PHB can be made by the method of Bloembergen and Holden, Macromolecules 1989, Vol 22, p1656–p1663. PHBV can be made by the method of Bloembergen, Holden, Bluhm, Haymer and Marchessault, Macromolecules 1989, Vol 22, p1663–1669).

The plasticiser is a material capable of plasticising polyester, i.e. capable of improving the ductility of the polyester and especially a material capable of plasticising PHB or PHBV. There may be one or more plasticisers present. For the ratio of such plasticiser to biodegradable polyester, the range up to 40 phr w/w (particularly 1 to 40 phr w/w) includes most of the likely uses and, for making effectively rigid but not brittle articles, the range 5–25 phr w/w is generally suitable.

Examples of suitable plasticisers are (A) high-boiling esters of polybasic acids, such as (i) phthalates and isophthalates, particularly compounds of the formula:

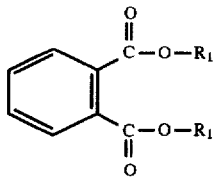

where $R_1$ is $C_{1-20}$ alkyl, cycloalkyl or benzyl, preferably $C_{5-11}$ alkyl, cyclohexyl or benzyl, especially isoheptyl, isooctyl, isononyl, isodecyl and isoundecyl. For example di-isodecylphthalate (Jayflex DIDP*), di-isooctylphthalate (Jayflex DIOP*), di-isoheptylphthalate (Jayflex77(DHIP*), di-baptylphthalate, di-rindecylphthalate, di-isononylphthalate (Jayflex DNIP*), di-isoundecylphthalate (Jayflex DIUP*), di-isodecylphthalate (Reomol DiDP*), di-isobutylphthalate (Reomol DiBP*) di-tridecylphthalate, butyl benzyl phthalate (Ketjenflex 160*);

(ii) citrates; International Patent Application No. PCT/GB 93/01689 discloses a range of doubly esterified hydroxycarboxylic acids having at least 3 ester groups in its molecule. A particularly preferred example from that disclosure is acetyl tri-n-butyl citrate (Estaflex*). Further citrates of the formula:

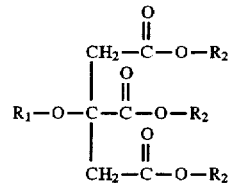

where $R_1$ is hydrogen or $C_{1-10}$ alkyl, and $R_2$ is $C_{1-10}$ alkyl, $C_{1-10}$ alkoxy or $C_{1-10}$ alkoxyalkyl. When $R_1$ and $R_2$ are alkyl each is preferably selected from straight or branched chain, methyl, ethyl, propyl, butyl, pentyl, hexyl, iso-propyl, isobutyl, or ethoxy, propoxy, butyoxy, butoxyethyl, butoxy-isopropyl and butoxy-ethoxy are encompassed by the present invention. Particular examples are: triethylcitrate, trimethylcitrate, n-butyl tri-n-hexylcitrate (Citroflex B6), tri-n-butylcitrate (Citroflex 4).

(v) fumarates;

(vi) glutamates such as diester ether alkyl (Plasthall 7050*);

(vii) adipates, such as those of the formula $R_1$—O—C(O)—(CH$_2$)$_4$—C(O)—OR$_1$ where $R_1$ and $R_2$ which may be the same or different are $C_{2-12}$ alkyl (e.g. butyl), $C_{2-12}$ alkoxy (e.g. butoxyethoxy), $C_{2-12}$ alkoxyalkyl (e.g.butoxyethyl), for example, di-2-ethylhexyl adipate (Reomol DOA*), di-isodecyl adipate, di-isononyl adipate, dioctyl adipate; The esterified radicals may be for example $C_1$–$C_{12}$ alkyl, aryl, aralkyl or aralkyl.

(viii) Sebacic acid derivatives of the formula $R_1$—O—C(O)—(CH$_2$)$_8$—C(O)—O—$R_1$ where $R_1$ is $C_{2-15}$ alkyl or $C_{2-15}$ alkoxyalkyl, for example, di-octyl sebacate, di-dodecyl sebacate, di-butoxyethyl sebacate, or di-n-butyl sebacate;

(ix) Azelaic acid derivatives of the formula $R_1$—O—C(O)—(CH$_2$)$_7$—C(O)—$R_1$ where $R_1$ is $C_{2-12}$ alkyl, benzyl, or $C_{2-12}$ alkoxy-alkyl, for example, di-n-butyl azelate and di-i-octyl azelate;

(B) high-boiling glycols, polyglycols, polyoxyalkylenes and glycerol each optionally substituted and optionally terminally esterified:

(i) high molecular weight glycols such as triethylene glycol diacetate (Estol 1593*), triethylene glycol caprylate (Plasthall 4141*), alkyl ethers/esters of general formula $R_1$—(O—CH$_2$—CH$_2$—O—CH$_2$—CH$_2$—O)$_n$—$R_1$ (optionally the repeating ethoxy can be isopropoxy) where n is 2 or more, for example Morton TP9OB* where $R_2$ is $C_4H_9$— and n is 2, Reomol BCF where $R_1$ is —C(O)—alkyl, $R_2$ is $C_4H_9$— and n is 2, Reomol BCD where $R_1$ is —C(O)—alkyl, $R_2$ is $C_4H_9$— and n is 2, Morton TP759*, compounds of such formula where $R_1$ is —C(O)—$C_mH_{2n+1}$ particularly up to m=20, e.g. lauryl when m is 12, palmitate when m is 15 or oleate when m is 15 and unsaturated, stearyl when n is 17, $R_2$ is sorbitan and n is up to 20, for example Tween 80 in which $R_2$ is sorbitan monooleate, $R_1$ is lauryl and n is 20; and such compounds containing irregularly spaced ether linkages, for example the compounds of the formula above in which $R_1$ hydrogen, $R_2$ is alkylphenyl where the alkyl is $C_{2-12}$ alkyl, and n is 2 to 100, for example, Igepal CA210* where the alkyl is $C_8$ alkyl and n is2, Igepal CA510* which is the same as CA210 except that n is 5, Triton X-100* and Triton X-405* which is the same as Igepal CA510* except that n is 10 and 40 respectively, Plasthall CPH27N, CPH30N and CPH39 where $R_1$ is hydrogen, $R_2$ is $CH_3$—$(CH_2)_{10}$—$C(O)$— and n is 10, 5 and 15 respectively, Plasthall CPH39N and CPH41N in which $R_1$ is hydrogen, $R_2$ is $CH_3$—$(CH_2)_7$—$CH=CH$—$(CH_2)_7$—$C(O)$— and n is 5 and 15 respectively; PEG 2000, PEG 6000 and PEG 10000 where $R_1$ and $R_2$ are both hydrogen and n is 50, 150 and 200 respectively;

(ii) examples of polyglycols are poly(propylene glycol) (PPG 100*, PPG 725*, PPG 425*), poly(ethylene) glycol (PEG 300*, PEG 200*);

(iii) examples of glycerol derivatives are glycerol tricaprolate, glycerol tributyrate;

(iv) pentaerythritols and derivatives;

The acid-derived radical of the ester typically contains 2–10 carbon atoms.

(C) sulphonic acid derivatives such as toluenesulphonamide (Ketjenflex 15*, Ketjenflex 8*, Ketjenflex 7*, Ketjenflex 3*);

(D) epoxy derivatives such as the compounds of formula $CH_3$—$(CH_2)_n$—A—$(CH_2)_n$—R in which the A is an alkene containing one or more double bonds (i.e. unsaturated fatty acids), n is up to 25 and R is $C_{2-15}$ alkyl, epoxidised esters of fatty acids, epoxidised soya bean oil, epoxidised linseed oils, epoxidised octyl tallate, epoxidised glycololeate, e.g. Lankro EDG*, Lankro GE*, Paraplex G60*, Paraplex G62*, Plasthall E50*, Rheoplas 39* and Lankro L*;

(E) substituted fatty acids such as palmitates, stearates, oleates, ricinoleates and laurates, for example, sorbitan monolaurate, sorbitan monooleate, poly(oxyethylene) (20) Sorbitan monolaurate (Tween 20*), poly(oxyethylene)(4) lauryl ether (Brij 30*), butyl acetyl ricinoleate (BAR*);

(F) phosphoric acid derivatives (phosphates), particularly compounds of the formula $O=P(OR)_3$ where R is alkyl, alkoxyalkyl, phenyl or phenylalkyl for example, isopropylphenyl. Particular examples are: phosphate ester (Reomol 249*), tri-isopropyl phenyl phosphate (Reofos 95*); and phosphonic acid derivatives and phosphites;

(G) chlorinated paraffins such as Cereclor 56L*, Cerechlor 552;

(H) polymeric esters such as those of the formula —O—C(O)—$R_1$—C(O)—O—$R_2$—O— in which $R_1$ and $R_2$ are both independently $C_{2-12}$ alkyl, or $R_2$ may be derived from a diol such as 1,2-propanediol, 1,3-butanediol, 1,4-butanediol or 1,6-hexanediol; for example:

(i) glutaric polyesters (polyester glutarates) having molecular weights from 2000 to 20,000, e.g. Plasthall 550*, Plasthall 7046*, Plasthall 7092* Paraplex P550*, Paraplex P7035*;

(ii) adipic polyesters (polyester adipates) having a molecular weight from 200 to 20000, for example, Plasthall 643*, Plasthall 650*, poly(propylene) adipate for example LANKROFLEX PLA*, LANKROFLEX PPL*, LANKROFLEX PPA/3*, Paraplex G56*, Paraplex G59*, Diolpate 214*, Diolpate 917*;

(iii) succinic polyesters;

(iv) sebacic polyesters (polyester sebacate) having a molecular weight from 4000 to 10000, preferably 8000, for example, Plasthall 1070*;

(iv) Diolpate OL1696*, Diorex 570*;

(v) lactone copolymers of the formula [—(O—C(O)—$R_1$—C(O)—O—)—$(R_2$—O)$]_m$—[(C(O)—$R_3$—O—)]$_n$ where $R_1$ and $R_2$ are both independently $C_{2-12}$ alkyl, or $R_2$ may be derived from a diol such as 1,2-propanediol, 1,3-butanediol, 1,4-butanediol or 1,6-hexanediol, and $R_3$ is —$(CH_2)_5$— (based on caprolactone);

(vi) polyesters such as Reoplex 346*, Reoplex 1102*, Reomol MD (ester of mixed adipic, glutaric and succinic acids with isodecanol), polycaprolactone triol (PCL Triol (300)*);

(J) Wolflex-But*;

Generally it is preferred that the plasticiser should be biodegradable.

Preferred plasticisers are the polymeric esters, high-boiling glycols, polyglycols, polyoxyalkylenes and glycerol each optionally substituted and optionally terminally esterified, epoxidised soyabean oils, adipates, sebacates, phosphate esters, phthalates, citrates, castor oil, chlorinated paraffins and toluene sulphonamide derivatives.

Particularly preferred are epoxidised natural oils, phthalate derivatives, polypropylene adipates, phosphoric acid derivatives, polymeric esters. Especially polypropylene glycol adipate, substituted polyethylene glycol, polyester glutarate and epoxidised soyabean oil.

Plasticisers which are particularly preferred for conferring improved impact properties are high molecular weight glycols of general formula $R_2$—(O—$CH_2$—$CH_2$—O—$CH_2$—$CH_2$—O)$_n$ —$R_1$, for example Reomol BCD, adipates, for example di-isodecyl adipate, mixed polyesters, for example Reomol MD, polyester glutarate, for example Paraplex 550, and citrates.

In a further aspect of the invention the polyester composition may contain at least two plasticisers selected from those defined herein. In a yet further aspect of the present invention the polyester composition may contain one or more plasticisers selected from those defined herein and may additionally contain one or more plasticisers previously known to plasticise polyhydroxyalkanoates, for example, citrates containing doubly esterified hydroxycarboxylic acids having at least 3 ester groups in the molecule, glycerol triacetate and glycerol diacetate. Of particular interest is a polyester composition containing as plasticisers acetyl tri-n-butyl citrate (Estaflex*) and any of the plasticisers defined herein, especially acetyl tri-n-butyl citrate (Estaflex*) and epoxidised soya bean oil.

The invention further provides for the use of any of the plasticisers defined above for plasticising a biodegradable polyester composition as defined above.

The composition can contain the usual polymer processing additives such as fillers, fibres, nucleants, for example boron nitride, and pigments such as titanium dioxide. It can be in the form of mouldings, extrudates, coatings, films or fibres, including multilayer coatings, films or fibres. The nucleant is generally present in amounts from 0.1 phr to 10 phr w/w, preferably 1 to 5 phr w/w.

The invention provides methods of making the composition by mixing its components. If desired, this may be effected in a solvent, such as a halogenated hydrocarbon or alkylene carbonate. Such a method is convenient for coating or for centrifugal spinning of fibres. More conveniently, the plasticiser is mixed with powdered dry polymer and the mixture is treated in conditions of shear, such as in a plastic mill or extruder. The product is then granulated and used as feed for a shaping operation such as extrusion, injection moulding, injection blow-moulding or compression moulding.

The composition is especially useful for making the following shaped articles: films, especially for packaging, fibres, non-woven fabrics, extruded nets, personal hygiene products, bottles and drinking vessels, agricultural and horticultural films and vessels, ostomy bags, coated products (such as paper, paperboard, non-woven fabrics), agricultural and horticultural films and vessels, slow-release devices. Alternatively, the polymer composition with suitable additives can be used as an adhesive.

The invention is now further described, but is not limited by, the following examples. In the following examples the tests were conducted with PHBV of the (R)-3-hydroxy form.

EXAMPLE 1

Compositions were prepared by mixing PHBV copolymer (10% HV) (500 g) with 1 phr boron nitride (as nucleant) and 20 phr of plasticiser. The mixture was extruded in a Betol 2520 extruder under these conditions: Zone 1=130° C.; Zone 2=140° C.; Zone 3=150° C.; Die=150° C.; Screw Speed= 100 rpm.

The extrudate, a single 4 mm lace, was crystallised at 50°–60° C. in a water bath, dried in a current of air and cut into granules.

The granules were then injection moulded (Boy 15S) into tensile bars, dumbbell shaped according to ISO R 537/2, their prismatic part measuring 40×5×2 mm. The bars were numbered as they came out of the mould, then allowed to cool at ambient temperature.

Injection moulding conditions were: Barrel Zone 1=130° C.; Barrel Zone 2=130° C.; Nozzle=130° C.; Mould heater temperature=74°–77° C.; Mould temperature=60° C.; Pressure hold on time=12 sec; Cooling time=30 sec; Injection pressure 45 bar; Screw speed=250 rpm.

Tensile testing was carried out using an Instron 1122 fitted with a Nene data analysis system. The jaw separation used was 50 mm and crosshead speed was 10 mm/min$^{-1}$. The samples were measured after 30 days for elongation at break. The results are presented in Table 1 in percentage elongation to break (E%) relative to the starting gauge length of 40 mm.

Glass transition temperature ($T_g$) measurement

The blends were prepared by dispersing the plasticiser (20 phr) onto 10 g of PHBV copolymer (10% HV). The plasticiser was dissolved in 20–25 ml methanol (or chloroform if immiscible with methanol) and the polymer powder fully wetted. The solvent was allowed to evaporate off at room temperature for 3–4 hours before the blend was finally dried at 60° C. for 30 minutes.

The $T_g$ measurement was carried out by differential scanning calorimetry (DSC) analysis using a Perkin Elmer DSC7 under a nitrogen atmosphere. 10 mg samples were used in the following temperature regime: melt sample at 200° C. for 2 minutes, cool rapidly to −80° C. and hold at this temperature until the system has equilibrated. Heat at 20° C. min$^{-1}$ from −80° C. to 50° C. The $T_g$ was reported as the point of inflection (in the trace) for the second heating step.

TABLE 1

| Plasticiser | $T_g$/°C. | E (%) |
|---|---|---|
| No plasticiser | 0 | 8.5 |
| poly(ethylene glycol) (PEG 200) | −19.5 | 10 |
| poly(ethylene glycol) (PEG 300) | −20.5 | 11.75 |
| poly(propylene glycol) (PPG 1000) | −10.19 | 12.75 |
| ditridecyl phthalate | −10.92 | 12.75 |
| poly(oxyethylene)(4)lauryl ether (Brij 30) | −9.3 | 13.75 |

TABLE 1-continued

| Plasticiser | $T_g$/°C. | E (%) |
|---|---|---|
| poly(oxyethylene)(20)sorbitan monolaurate (Tween 20) | −16.6 | 14 |
| di-isoundecylphthalate (Jayflex DIUP) | −8.38 | 14.5 |
| polycaprolactone triol (PCL (Mw 300) | −8.3 | 15.75 |
| poly(propylene glycol) (PPG 425) | −23.13 | 16.75 |
| di-isononylphthalate (Jayflex DINP) | −12.77 | 16.75 |
| di-isoheptylphthalate (Jayflex 77 DIHP) | −19.42 | 20 |
| poly(propylene glycol) (PPG 725) | −14.2 | 21.5 |
| di-iso-octylphthalate (Jayflex DIOP) | −15.84 | 22 |
| di-isodecylphthalate (Jayflex DIDP) | −10.06 | 22.5 |
| epoxidised soya bean oil (Reoplast 39) | −9.5 | 34.25 |

The plasticisers used in this example are available from commercial suppliers (BDH, Aldrich Chemicals, Exxon Chemicals, and Ciba Geigy).

EXAMPLE 2

Compositions were prepared by mixing PHBV copolymer (11% HV) (500 g) with 1 phr boron nitride (as nucleant) and 100 g (20 phr) of plasticiser. The mixture was extruded in a Betol 2520 extruder under these conditions: Zone 1=115° C.; Zone 2=133° C.; Zone 3=153° C.; Die=158° C. =Screw Speed=100 rpm.

The extrudate, a single 4 mm lace, was crystallised at 50°–60° C. in a water bath, dried overnight at a low temperature (40° C.) and cut into granules.

The granules were then injection moulded (Boy 15S) into tensile bars, dumbbell shaped according to ISO R 537/2, their prismatic part measuring 40×5×2 mm. The bars were numbered as they came out of the mould.

Injection moulding conditions were: Barrel Zone 1=130° C.; Barrel Zone 2=130° C.; Nozzle=134° C.; Mould heater temperature=74°–77° C.; Mould temperature=60° C.; Pressure hold on time=12 sec; Cooling time=12 sec; Injection pressure=45 bar; Screw speed=250 rpm.

Tensile testing was carried out using an Instron 1122 fitted with a Nene data analysis system. The jaw separation used was 50 mm and crosshead speed was 10 mm/min$^{-1}$. The samples were measured after 90 days for elongation at break. The results are presented in Table 2 as percentage elongation to break relative to the starting gauge length of 40 mm.

The $T_g$ tests of this example were carried out on samples taken from the extruded lace. The DSC analysis was conducted as in Example 1 except for the following conditions: sample size=7–10 mg; sample cooled rapidly to −50° C. at 100° C. min$^{-1}$; allowed to equilibriate at −50° C.; heated at 20° C. min$^{-1}$ to 205° C.

The plasticisers used in this example are available from commercial suppliers (Unichema International, Akzo Chemie, FMC Corporation, C.P. Hall, ICI, Kemira Polymers).

TABLE 2

| Plasticiser | $T_g$/°C. | E (%) |
|---|---|---|
| No plasticiser | 0.8 | 13.5 |
| D-A Sebacate | −8.7 | 16.5 |
| glycerol diacetate (Estol 1582) | −12.9 | 19.5 |
| toluene sulphonamide (Ketjenflex 3) | −8.6 | 21.8 |
| toluene sulphonamide (Ketjenflex 7) | −10.2 | 24 |
| di-2-ethylhexyl adipate (Reomol DOA) | −10.7 | 26.5 |

TABLE 2-continued

| Plasticiser | $T_g$/°C. | E (%) |
|---|---|---|
| butyl acetyl ricinoleate (BAR) | −8.5 | 28.3 |
| di-isobutylphthalate (Reomol DiBP) | −16 | 28.5 |
| diester ether alkyl (Plashall 7050) | −26.3 | 29.3 |
| toluene sulphonamide (Ketjenflex 8) | −7.8 | 29.3 |
| triethylene glycol diacetate (Estol 1593) | −28 | 32 |
| triethylene glycol caprylate (Plasthall 4141) | −24 | 34 |
| alkyl aryl phosphate (Ketjenflex 141) | −17.8 | 34.5 |
| toluene sulphonamide (Ketjenflex 15) | −7.4 | 38 |
| chlorinated paraffin (Cereclor 56L) | −7.2 | 41.5 |
| polyester (Reoplex 346) | −16.4 | 42.3 |
| di-isodecylphthalate (Reomol DiDP) | −6.6 | 43.8 |
| adipic polyester (Plasthall 643) | −11.4 | 45 |
| butyl benzyl phthalate (Ketjenflex 160) | −13.8 | 45.3 |
| chlorinated paraffin (Cerechlor 552) | −11.8 | 51.5 |
| Wolflex-But | −9.8 | 52.8 |
| glutaric polyester (Plasthall 550) | −7.8 | 52.8 |
| polyester (Reoplex 1102) | −13.5 | 53.5 |
| polymeric ester (Diorex 570) | −14 | 54.3 |
| polymeric ester (Diolpate OL1696) | −15 | 54.8 |
| tri-isopropyl phenyl phosphate (Reofos 95) | −9.2 | 55.3 |
| phosphate ester (Reomol 249) | −17.3 | 60.8 |

EXAMPLE 3

Compositions were prepared by mixing PHBV copolymer (6.6% HV, Mw of 680,000) with 1 phr boron nitride (as nucleant) and 20 phr of plasticiser. The mixture was blended for 10 minutes then extruded in a Betol 2520 extruder under the following conditions:

Zone 1=non-plasticised 140° C.; plasticised 130° C.;

Zone 2=non-plasticised 150° C.; plasticised 140°;

Zone 3=non-plasticised 160° C.; plasticised 140° C.;

Die=non-plasticised 160° C.; plasticised 150° C.;

The extrudate, a single 4 mm lace, was crystallised at 50°–60° C. in a water bath, dried overnight at a low temperature (40° C.) and cut into granules.

The granules were then injection moulded (Boy 305) into tensile bars, dumbbell shaped according to ISO R 537/2, their prismatic part measuring 40×5×2 mm. The bars were numbered as they came out of the mould.

Injection moulding conditions were:

Zones 1 to 3 temperature=as for the extrusion process;

Injection time=16 seconds;

Nozzle temperature=1 50° C.;

Mould heater temperature=60°–70° C.;

Mould temperature=60° C.;

Pressure hold on time=16 sec;

Cooling time=16 sec;

Screw speed=240 rpm.

Tensile testing was carried out using an Instron 4501 instrument system. The jaw separation used was 50 mm and crosshead speed was 10 mm/min$^{-1}$. The samples were measured after 30 days for elongation at break. The results are presented in Table 3 as percentage elongation to break relative to a starting gauge length of 40 mm.

The $T_g$ tests of this example were carried out on samples from the injection moulded test pieces. The DSC analysis was conducted as in Example 1 except for the following conditions: sample size=7–10 mg; sample cooled rapidly to −80° C. at 100° C. min$^{-1}$; allowed to equilibriate at −80° C.; heated at 20° C. min$^{-1}$ to 200° C.

The results are presented in Table 3 as percentage elongation to break relative to a starting gauge length of 40 mm.

Impact testing was carried out on a notched impact test piece of 11.8 mm×1.3 mm×4 mm using a Zwick Izod impact tester at 28° C. The results are presented in Table 3. Where a $T_g$ is available for the material this is placed alongside the result in the Table.

TABLE 3

| Plasticiser | % E | $T_g$ | Plasticiser | IZOD | $T_g$ |
|---|---|---|---|---|---|
| None | 15.4 |  | None | 70.8 |  |
| 1 | 15.4 |  | 5 | 71 |  |
| 2 | 18.5 |  | 53 | 98.8 |  |
| 3 | 16.7 |  | 44 | 104 |  |
| 4 | 17.0 |  | 4 | 105 |  |
| 5 | 17.4 |  | 18 | 107.8 | −8.3 |
| 6 | 17.7 | −11.9 | 38 | 110 |  |
| 7 | 18.9 |  | 41 | 110.3 | 1.39 |
| 8 | 18.9 |  | 17 | 111.3 |  |
| 9 | 19.1 | −13.5 | 26 | 111.8 |  |
| 10 | 20.4 |  | 56 | 112 |  |
| 11 | 20.5 | −19.6 | 23 | 117 |  |
| 12 | 21.3 |  | 15 | 125 |  |
| 13 | 22 | −12.7 | 50 | 125.3 |  |
| 14 | 22.1 | −18.6 | 1 | 127.1 |  |
| 15 | 23.1 |  | 17 | 128 |  |
| 16 | 23.3 |  | 64 | 129.8 | −22.8 |
| 17 | 24.2 |  | 65 | 130.3 | −10.5 |
| 18 | 24.6 | −8.3 | 10 | 130.3 |  |
| 19 | 24.7 | −12.6 | 66 | 135 | −7.5 |
| 20 | 25 | −8.5 | 3 | 136.8 |  |
| 21 | 25 |  | 32 | 138 |  |
| 22 | 25 |  | 21 | 142.8 |  |
| 23 | 25.2 |  | 60 | 144.8 |  |
| 24 | 25.6 | −4.2 | 48 | 149.8 | −3.67 |
| 25 | 26.1 | −3.8 | 52 | 152 |  |
| 26 | 26.2 |  | 47 | 155.8 |  |
| 27 | 26.8 | −25.3 | 7 | 155.8 |  |
| 28 | 27.8 | −22.8 | 40 | 159 |  |
| 29 | 29.4 | −21.5 | 36 | 160.8 |  |
| 30 | 29.6 | −18.5 | 34 | 164.3 | −6.5 |
| 31 | 29.6 | −6.1 | 51 | 164.8 |  |
| 32 | 30.2 |  | 63 | 166.3 | −3.5 |
| 33 | 30.3 | −17.9 | 49 | 166.8 | −15.8 |
| 34 | 30.8 | −6.5 | 58 | 166.8 |  |
| 35 | 31.1 |  | 43 | 167.3 |  |
| 36 | 31.3 |  | 16 | 167.8 |  |
| 37 | 31.3 | −18.3 | 6 | 169.4 | −11.9 |
| 38 | 31.7 |  | 29 | 170.8 | −21.5 |
| 39 | 33.3 | −26.2 | 62 | 182.3 | −6.6 |
| 40 | 34.2 |  | 33 | 183.3 | −17.9 |
| 41 | 34.3 | −1.4 | 56 | 185 |  |
| 42 | 34.4 | −22.0 | 13 | 186.6 | −12.7 |
| 43 | 35.3 | −10.8 | 45 | 187.3 | −6.3 |
| 44 | 35.4 |  | 31 | 192.8 | −6.1 |
| 45 | 36 | −6.3 | 2 | 195.4 |  |
| 46 | 36.4 | −2.1 | 67 | 197.5 | −3.1 |
| 47 | 38.5 |  | 19 | 197.8 | −12.6 |
| 48 | 38.6 | −3.7 | 61 | 197.8 |  |
| 49 | 39 | −15.8 | 59 | 198.8 | −13 |
| 50 | 40.5 |  | 57 | 200.8 | −4.2 |
| 51 | 40.6 |  | 68 | 201.8 | −25.3 |
| 52 | 42.9 |  | 14 | 202.8 | −18.6 |
| 53 | 47.6 |  | 35 | 204.8 |  |
| 54 | 48.4 | −14.5 | 25 | 215.8 | −3.8 |
| 55 | 48.4 | −1.2 | 9 | 220.8 | −13.5 |
| 56 | 48.6 |  | 37 | 227.3 | −18.3 |
| 57 | 55.7 | −4.2 | 38 | 227.8 |  |
| 58 | 59.3 |  | 42 | 228.3 | −22 |
| 59 | 60.7 | −13.0 | 39 | 231.8 | −26.2 |
| 60 | 68.9 |  | 11 | 235.6 | −19.6 |
| 61 | 82.3 |  | 55 | 241 | −1.2 |
| 62 | 96.6 | −6.56 | 20 | 243.3 | −8.5 |
| 63 | 162.7 | −3.49 | 30 | 251.8 | −18.5 |
|  |  |  | 69 | 257.8 | −1.5 |
|  |  |  | 54 | 271.3 | −14.5 |
|  |  |  | 22 | 273.8 |  |
|  |  |  | 46 | 301.3 | −2.1 |
|  |  |  | 12 | 265.8 |  |

TABLE 3-continued

Key 1. 1,4-butane diol adipic acid (S102250) available from Occidental Chemical
2. 1,4-butane diol adipic acid (S102250) (35 phr)
3. polyethylene glycol 2000 available from Aldrich Chemical
4. polycaprolactone (Tone 301) available from Union Carbide
5. polyethylene glycol 6000 available from Aldrich Chemical
6. Triton X100 (polyethoxyethanol) available from Aldrich Chemical
7. 1,4-butane diol adipic acid (S1063210) available from Occidental Chemical
8. neopentylglycol-adipic acid-caprolactone (S1063210) available from Occidental Chemical
9. triethylcitrate (Citroflex 2) available from Morflex Inc.
10. polyester adipate (MW = 2000) (Plasthall P643) available from C. P. Hall
11. Morton TP95 (polyether) available from Morton Thiokol Inc
12. di-isononyladipate (Jayflex DINA2) available from Exxon Chemical
13. Reomol 249 (phosphate ester) available from FMC Corporation
14. Monoplex 573 (epoxidised octyl tallate) available from C. P. Hall
15. PEG 600 monolaurate (Plasthall CPH43N) available from C. P. Hall
16. Epoxidised soyabean oil (Plasthall ESO) available from C. P. Hall
17. PEG 200 Monolaurate (Plasthall CPH27N) available from available from C. P. Hall
18. Epoxidised soya bean oil (Paraplex G60) available from C. P. Hall
19. acetyl tri-n-butyl citrate (Citroflex A4) available from Morflex Inc
20. acetyl triethyl citrate (Citroflex A2) available from Morflex Inc
21. polyester sebecate (Plasthall P1070) available from C. P. Hall
22. neopentylglycol-adipic acid-caprolactone (S1063210) (35 phr) available from Occidental Chemical
23. F1040250 trifunctional polyester adipates available from Occidental Chemical
24. polypropylene glycol adipate (low MW) (Lankroflex PPL) available from Harcros Chemicals
25. di isooctylazelate (Reomol DIOZ) available from FMC Corporation
26. polyester adipate (MW = 1200) (Plasthall P650) available from C. P Hall
27. Butyl carbitol ether/ester (Reomol BCF) available from FMC Corporation
28. epoxidised linseed oil (Lankroflex L) available from Harcros Chemicals
29. epoxidised ester of fatty acid (Lankroflex ED6) available from Harcros Chemicals
30. tri-n-butylcitrate (Citroflex 4) available from Morflex Inc
31. epoxidised soyabean oil (Paraplex G62) available from C. P. Hall
32. polyoxyethylene laurate (Plasthall CPH 376N) available from C. P. Hall
33. Morton TP759 available from Morton Thiokol
34. dioctyladipate (Jayflex DOA2) available from Exxon Chemical
35. polyester glutarate (Plasthall P7092) available from C. P. Hall
36. polyester adipate (Diolpate 917) available from Kemira Chemical
37. butyl carbitol ether/ester (Reomol BCD) available from FMC Corporation
38. octylphenyl substituted PEG (Igepal CA520)
39. Morton TP90B available from Morton Thiokol
40. trifunctional polyester adipates (F1040250) (35 phr) available from Occidental Chemical
41. epoxidised soya bean oil (Lankroflex GE) available from Harcros Chemical
42. acetyltributylcitrate (Estaflex*) available from Akzo Chemie
43. acetyltrimethylcitrate available from Morflex Inc
44. PEG 600 monooleate (Plasthall CPH41N) available from C. P. Hall
45. butyl-tri-n-hexyl citrate (Citroflex B6) available from Morflex Inc
46. di-isodecyladipate (Jayflex DIDA2) available from Exxon Chemical
47. polyester adipate (Diolpate 214) available from Kemira Polymers
48. epoxidised soya bean oil (Reoplas 39) available from Ciba Geigy
49. di-n-butyl sebecate (Reomol DBS) available from Ciba Geigy
50. polyester adipate (MW = 4200) (Diolpate 214) available from Kemira Polymers
51. epoxidised glycol oleate (Monoplex S75) available from C. P. Hall
52. PEG 400 Monolaurate (Plasthall CPH30N) available from C. P. Hall
53. Castor oil available from Aldrich Chemical
54. Estaflex*/epoxidised soyabean oil (Reoplas 39) (50/50) available from Akzo Chemie/Ciba Geigy
55. polyester glutarate (Paraplex P550) available from C. P. Hall
56. S1069285 (35 phr) available from Occidental Chemical
57. PPG phthalate/adipate blend (Lankroflex 828) available from Harcros Chemical
58. polyester adipate (Paraplex G59) available from C. P. Hall
59. tri-isopropyl phenyl phosphate (Reofos 95) available from FMC Corporation
60. polypropylene adipate (Diolpate PPA350) available from Kemira Polymers
61. polyester glutarate (Plasthall P7035) available from C. P. Hall
62. PEG mono (1,1,3,3-tetramethylbutyl-phenyl ether (Igepal CA210) available from Aldrich Chemical
63. polypropyleneglycol adipate high MW (Lankroflex PPA3) available from Harcros Chemical
64. PEG 200 monooleate ( Plasthall CPH27N) available from C. P. Hall
65. polyoxyethlene sorbitanmonolaurate (Tween 80) available from Aldrich Chemical
66. trimethylcitrate available from Morflex Inc
67. polyester glutarate (Plasthall P7046) available from C. P. Hall
68. butyl carbitol ether/ester (Reomol BCF) available from FMC Corporation
69. mixed polyester (Reomol MD) (ester of mixed adipic, glutaric and succinic acids with isodecanol) available from FMC Corporation

Conclusions

All of the compounds evaluated as plastisicers in this example offer improved mechanical properties, and many of them demonstrated considerable improvements in elongation to break over the control which contained no processing additives. The most effective plasticiser was a polypropylene glycol adipate. A substituted polyethylene glycol (Igepal CA210) gaive very good results as did some of the polyester glutarates. Phosphate esters, castor oil, epoxidised soya bean oils, epoxidised stearates, high boiling adipate and sebacate esters, citrates and a number of polyethylene glycol derivatives yielded elongations which were double that observed for the control. Blends of plasticisers were also effective. For example, a 50:50 blend of a citrate ester (Estaflex*) and an epoxidised soyabean oil gave superior results to when the plasticisers were used alone.

Traditional plasticiser theory predicts that the best plasticisers would yield the lowest $T_g$s. In this system, this is clearly not the case. For example, th emost effective plasticiser in this study was Lankroflex PPA3. This gave an elongation to break of 162.7%. The $T_g$ was only 3.5° C. By contrast Reomol BCF with a much lower $T_g$ of −25.3° C. gave a much poorer elongation to break of 26.8%.

The Izod impact performance demonstrates a better correlation with $T_g$. Substituted PEGs such as Reomol BCD and the Morton range of plasticisers gave good results. Citrate esters were also highly effective.

We claim:

1. Process for making, by extrusion, injection moulding, injection blow moulding, compression moulding, film or fibre formation or coating, a shaped article consisting essentially of biodegradable polyester characterised by:

(a) using as said polyester a (hydroxybutyrate-co-valerate) containing 70–98 mol percent of hydroxybutyrate; and (b) having present in said polyester 5–25 phr w/w of at least one plasticiser selected from the group:

A high-boiling esters selected from phthalates of the formula

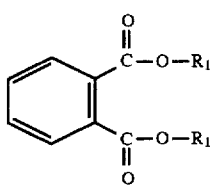

where $R_1$ is $C_{1-20}$ alkyl, adipates of the formula
$R_1—O—C(O)—(CH_2)_4—C(O)—OR_2$
where $R_1$ and $R_2$ which may be the same or different are $C_{22-12}$ alkyl or $C_{2-12}$ alkoxyalkyl;

sebacates of the formula $R_1—O—C(O)—(CH_2)_8—C(O)—O—R_1$ where $R_1$ is $C_{2-15}$ alkyl or $C_{2-15}$ alkoxyalkyl;

azelaates of the formula $R_1O—C(O)—(CH_2)_7—C(O)—OR_1$ where $R_1$ is $C_{2-12}$ alkyl, benzyl, or $C_{2-12}$ alkoxyalkyl;

citrate esters of the formula:

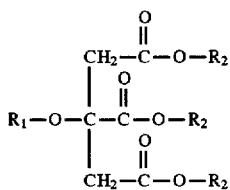

where $R_1$ is hydrogen or $C_{1-10}$ alkyl, and $R_2$ is $C_{1-10}$ alkyl or $C_{1-10}$ alkoxyalkyl;

B alkyl ethers/esters of general formula

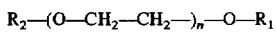

where $R_1$ is alkyl or-C(O)-alkyl; $R_2$ is alkyl; and n is 2 or more; or where $R_1$ is hydrogen; and either:

$R_2$ is alkylphenyl where the alkyl is $C_{2-12}$ alkyl, and n is 1 to 100; or $R_2$ is $CH_3—(CH_2)_{10}—C(O)—$ and n is 10, 5 or 15; or $R_2$ is $CH_3—(CH_2—)_7CH=CH—(CH_2)_7—C(O)—$ and n is 5 or 15.

C epoxy derivatives of the formula

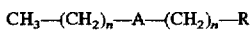

in which the A is an alkene containing one or more double bonds, n is up to 25 and R is $C_{2-15}$ alkyl; and D ricinoleate esters;

E polymeric esters of formula

in which $R_1$ and $R_2$ are both independently $C_{2-12}$ alkylene.

2. Process according to claim 1 in which the high-boiling ester is selected from diisodecyl phthalate diisooctyl phthalate diisodecyl adipate di-n-butyl sebacate dioctyl adipate diisononyl adipate diisooctyl azelaate isodecanol esters of adipic, glutaric and succinic acids.

3. Process according to claim 1 in which the citrate ester is selected from butyl-tri-n-hexyl citrate triethylcitrate tri-n-butyl citrate.

4. Process according to claim 1 in which the alkyl ether/ester is selected from

PEG 600 monooleate

PEG 400 monolaurate

PEG 600 monolaurate

PEG 200 monolaurate butyl carbitol ether/ester octyl phenyl substituted polyethyleneglycol.

5. Process according to claim 1 in which the ricinoleate ester is castor oil.

6. Process according to claim 1 in which the epoxy derivative is selected from the class consisting of epoxidised esters of fatty acids;

epoxidised soya bean oil;

epoxidised linseed oil;

epoxidised octyl tallate;

epoxidised glycololeate.

7. Process according to claim 1 in which the polymeric ester is selected from glutaric polyesters having molecular weights from 2000 to 20,000;

adipic polyesters having a molecular weight from 200 to 20,000;

succinic polyesters;

sebacic polyesters having a molecular weight from 4000 to 10,000.

8. Process according to any one of the preceding claims in which there is used additionally a plasticiser selected from citrates containing doubly esterified hydroxycarboxylic acids having at least 3 ester groups in the molecule, glycerol triacetate and glycerol diacetate.

9. Process according to claim 8 in which the additional plasticiser is acetyl tri-n-butyl citrate.

* * * * *